United States Patent [19]

Howeth

[11] Patent Number: 4,482,367
[45] Date of Patent: Nov. 13, 1984

[54] SELF-CLEANING AIR FILTER SYSTEM

[76] Inventor: D. Franklin Howeth, 233 Chuck Wagon Trail, Fort Worth, Tex. 76108

[21] Appl. No.: 398,684

[22] Filed: Jul. 15, 1982

[51] Int. Cl.$^3$ ............................................. B01D 46/04
[52] U.S. Cl. .................................... 55/304; 55/385 B; 55/310; 55/498; 406/172; 406/173
[58] Field of Search ............. 55/300, 304, 305, 385 B, 55/498, DIG. 3, 310, 311, 507, 508, 509; 15/347, 352; 406/171–173

[56] References Cited

U.S. PATENT DOCUMENTS

| | | | |
|---|---|---|---|
| 2,463,435 | 3/1949 | Smellie | 55/304 |
| 2,519,082 | 8/1950 | Stevenson | 183/51 |
| 3,219,394 | 11/1965 | Moss et al. | 406/171 |
| 3,273,943 | 9/1966 | Russell | 406/172 |
| 3,458,050 | 7/1969 | Cooper | 210/448 |
| 3,587,213 | 3/1970 | Tamny et al. | 55/300 |
| 3,618,300 | 12/1971 | Pausch | 55/273 |
| 3,639,940 | 2/1972 | Carlson et al. | 15/352 |
| 3,867,291 | 2/1975 | Schmidt, Jr. et al. | 210/139 |
| 4,067,708 | 1/1978 | Bykhover et al. | 55/304 |
| 4,199,334 | 4/1980 | Berkhoel | 55/304 |
| 4,218,227 | 8/1980 | Frey | 55/498 |
| 4,258,451 | 3/1981 | Sommerfield | 55/300 |
| 4,284,422 | 8/1981 | Ferland | 55/300 |
| 4,289,630 | 9/1981 | Schmidt, Jr. et al. | 55/300 |
| 4,345,353 | 8/1982 | Sommerfield | 55/300 |

Primary Examiner—David Lacey
Attorney, Agent, or Firm—Hubbard, Thurman, Turner & Tucker

[57] ABSTRACT

A self-cleaning impingement type air filter unit is mounted on a flexible elastomeric support member comprising an end wall of a filter housing exposed to the pressure differential between the interior housing chamber and the ambient pressure of the clean air discharge conduit. A standard pleated paper type porous media filter element is mounted on the flexible wall member and includes a support plate on which a mechanical vibrator is mounted whereby the complete filter element is mechanically oscillated to dislodge accumulated material on the surface of the filter media. The filter support structure includes a mounting flange which is adapted to be supported on a filter housing by yieldable springs which permit movement of the entire filter element and support structure to function as a pressure relief valve to limit the pressure differential across the filter housing. The system is particularly adapted for use with bulk material conveying systems operating at relatively low conveying air pressures of approximately 15 psig.

20 Claims, 6 Drawing Figures

SELF-CLEANING AIR FILTER SYSTEM

BACKGROUND OF THE INVENTION

1. Field of the Invention

The present invention pertains to a porous media impingement type air filter system including a filter unit which is operably connected to a mechanical vibrator and is supported on a flexible wall member forming a closure of one end of the filter chamber. The filter unit is adapted for use in conjunction with pneumatic bulk material conveying systems.

2. Background Art

In the art of porous media impingement or barrier type filter systems used for filtering dust and particulate matter out of a moving air stream, it has always been a problem to prevent unwanted clogging of the filter by accumulation of caked material on the filter media. The filter media must, inherently, accumulate particulate material in the performance of its function. However, continued accumulation of material eventually reduces the fluid flow area through the filter and increases the flowstream back pressure.

Several techniques have been developed to provide for the so called self-cleaning of impingement or barrier type air filter units. One approach involves providing apparatus for producing periodic pulsed jets or blasts of high velocity air in the reverse direction of the normal flow of air through the filter element to knock accumulated material off of the media. Such systems typically require a relatively high pressure source of compressed air to provide sufficient energy of the reverse flow to remove material accumulated on the filter media. This is particularly true for the preferred type of filter units which have a substantially rigid cylindrical element including a pleated media such as porous paper or similar material.

Another technique which has been developed for impingement or barrier type air filter units pertains to various arrangements for vibrating the filter element to periodically or continuously effect the removal of accumulated particulate material on the filter media. Known types of mechanical vibrating systems require specialized filter element structures such as, for example, the type of system wherein the filter element structure itself including the filter media is mechanically twisted or deflected to remove the accumulated material. This type of filter media cleaning system has the disadvantage of shortening the life of the filter due to mechanical fatigue of the filter media and adjacent supporting structure which is constantly being flexed or deflected.

Several other mechanical vibrating systems have been developed for various types of porous media impingement filters, all of which are relatively mechanically complex and are relatively unreliable due to the fact that the structure around and including the filter element is being constantly stressed in a cyclic manner resulting in early fatigue failure of one or more parts of the structure.

Accordingly, there has been a longfelt need for a self-cleaning type filter system which is adapted to utilize the preferred type of filter element characterized by a pleated porous media supported by associated structure which forms a substantially rigid and easily fabricated unit. Such types of filter elements have not easily lent themselves to use in connection with mechanical vibrating devices for continuously or periodically cleaning the filter media by vibrating or shaking the entire filter unit. However, the present invention provides an arrangement which mechanically vibrates the filter element with a particularly advantageous structure which is adapted for several filtering applications. In particular, one embodiment of the self-cleaning air filter system of the present invention is adapted for used in conjunction with pneumatic bulk material conveying systems and the like.

SUMMARY OF THE INVENTION

The present invention provides a unique self-cleaning air filter system of a type wherein mechanical vibration or oscillation of a filter unit is provided as a means of continuously or periodically removing accumulated dust or particulate material from the surface of a filter element having impingement or barrier type filter media.

In accordance with one aspect of the present invention, there is provided a self-cleaning air filter apparatus comprising a replaceable filter unit having a pleated porous media filter element wherein the filter unit is connected to a mechanical vibrator device and is supported by structure including a flexible wall member which delimits a portion of a filter chamber in which the filter unit is disposed. By mounting the filter unit on a resilient flexible wall member, the entire filter unit may be vibrated or oscillated to remove particulate material accumulated on the filter element. In this way, reduced stress and strain is imposed on the filter element itself. This arrangement is particularly advantageous for filters wherein the filter element comprises a porous media of substantially rigid material and which is normally supported by a light metal or plastic structure. The flexible wall member also forms a portion of the filter housing exposed to the pressure differential of the fluid pressure within the housing versus the ambient atmospheric pressure outside of the housing.

The present invention also provides for using standard commercial porous media filter elements which may be adapted to be used in conjunction with a vibratory type cleaning system without modifying the filter element itself. Moreover, the filter element mounting arrangement provides for vibratory cleaning of the filter media without substantially twisting or deflecting the media material thereby prolonging the life of filter units and associated structure since the entire filter unit is vibrated and is substantially isolated from its supporting structure by the resilient flexible wall member.

The present invention also provides an improved air filter system including a filter unit which also functions as a pressure relief valve when mounted on a filter housing normally exposed to fluid pressure greater than the surrounding ambient atmospheric pressure. Accordingly, the filter system of the present invention is particularly useful for applications wherein a limit pressure must be maintained within the system which is supplying pressure air to the filter housing. In accordance with the present invention, the supporting structure for the filter unit includes a flange member which may be mounted on a cooperating flange formed on a filter housing and wherein the entire filter unit including the supporting flange member may be yieldably biased into a sealing position against the housing flange but is movable to provide a pressure relief flow passageway for pressure air when a limit pressure differential across the filter element is experienced or when a maximum limit pressure within the filter element housing and associated pressure conduit system is experienced. Accordingly, with such an arrangement, the filter element is normally prevented from collapsing and the chance of structural failure of the pressure vessel system is minimized.

The present invention still further provides an improved self-cleaning air filter system which is particularly adapted for filtering a pressure air flowstream having relatively large concentrations of entrained particulate matter such as are experienced in pneumatic bulk material conveying systems. The overall arrangement of the self-cleaning filter unit, it supporting structure and the provision of fluid pressure relief means is particularly advantageous for use in combination with material conveying systems such as pneumatic unloading systems for bulk material transport vehicles and similar apparatus.

Additional advantages and superior features of the self-cleaning air filter system of the present invention will be appreciated by those skilled in the art upon reading the detailed description which follows in conjunction with the drawings.

DESCRIPTION OF THE PREFERRED EMBODIMENTS

In the description which follows, like parts are marked throughout the specification and drawings with the same reference numerals, respectively. The drawings are not necessarily to scale and the scale may be exaggerated in certain views to better illustrate the salient features of the invention.

Figure 1:
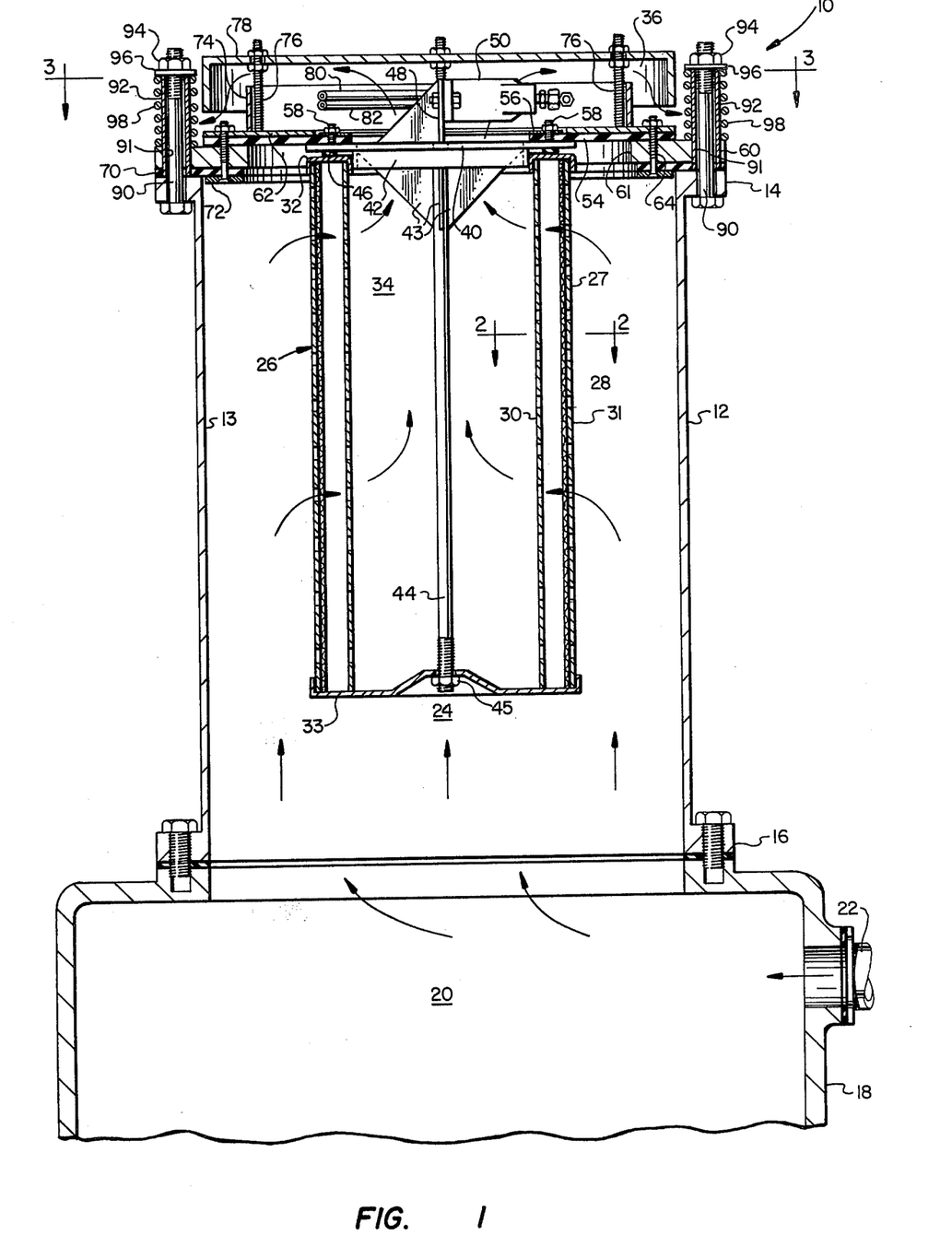
FIG. 1 is a vertical central section view of a self-cleaning air filter system in accordance with the present invention.
Figure 2:
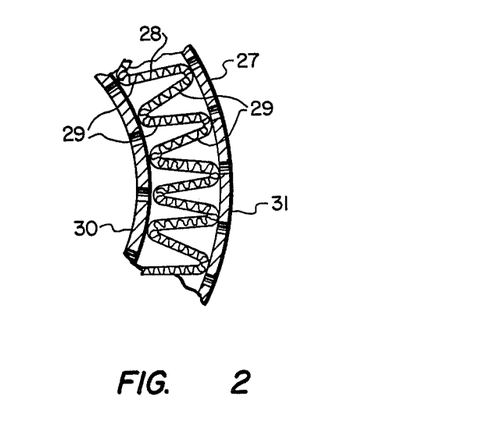
FIG. 2 is a detail section view taken generally from the line 2-2 of FIG. 1.
Figure 3:
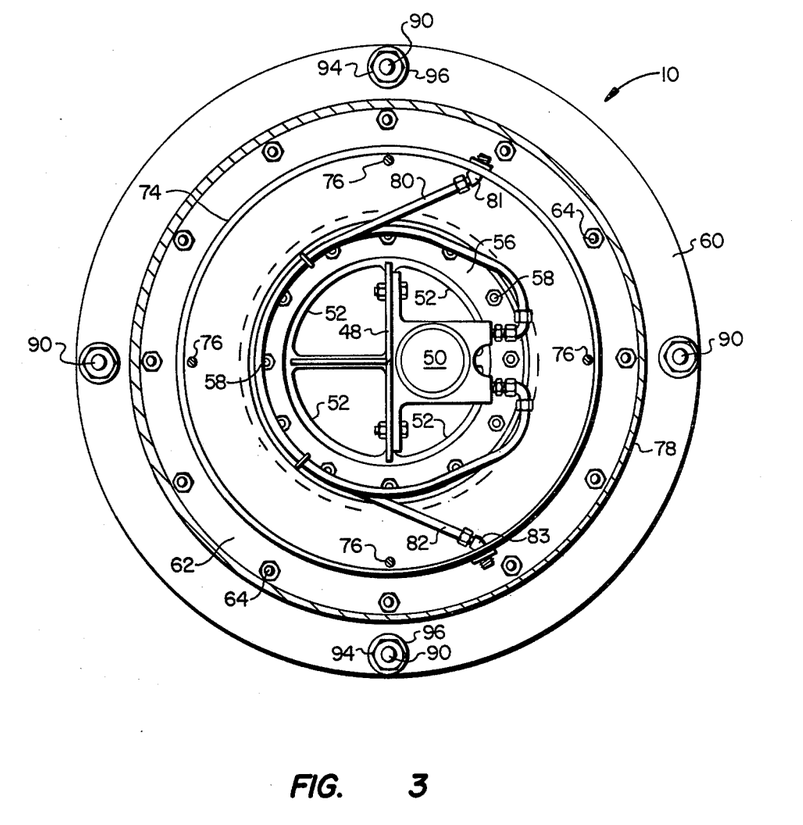
FIG. 3 is a view taken generally from the line 3-3 of FIG. 1.

Referring to FIGS. 1, 2 and 3, the self-cleaning filter system of the present invention is illustrated in a form which is adapted as an air filter apparatus, generally designated by the numeral 10. The filter apparatus 10 includes a generally cylindrical housing 12 having opposed end flanges 14 and 16 formed as an integral or fixed part of the housing, respectively. The filter apparatus 10 is adapted to be mounted on a housing 18 having an interior chamber 20 into which a flowstream of air laden with particulate matter may be introduced through a conduit 22. The conduit 22 and the interior chamber 20 may be configured to provide for inertial and gravitational separation of some of the particulate material entering the chamber wherein the separated material may drop into a bin or hopper portion of the housing 18, not shown. The air flow then enters a chamber 24 formed by the housing 12 and further, separation of entrained particulate material is performed by the filter system of the present invention.

The filter apparatus 10 is further characterized by a filter unit, generally designated by the numeral 26, which is of the porous media impingement type and includes an element 27 which comprises a generally cylindrical member having a filter media 28 made of relatively stiff paperlike material having a porosity which is pervious to air but which has the capability of entrapping fine particles entrained in the air flowstream. The filter media 28 is preferably arranged in a series of pleats 29, FIG. 2, and is supported between respective inner and outer cylindrical perforated metal support walls 30 and 31. The element 27 also includes upper and lower end caps 32 and 33 which are suitably secured to the walls 30 and 31 to form a substantially rigid structure. Accordingly, air passing through the pleats of the media 28 from the wall 31 and inwardly through the wall 30, enters a chamber 34 and flows upwardly through the chamber and to the exterior of the housing 12 through an annular passage 36. The filter element 27 is of a type which is commercially available and is representative of the state-of-the-art in high capacity impingement type air filter devices. The filter element 27 in itself is not a part of the instant invention and a further detailed description of the element is not believed to be necessary to practice the invention Referring particularly to FIGS. 1 and 3, the filter element 27 is arranged to be supported by improved structure in accordance with the present invention and including a support plate generally designated by the numeral 40. The support plate 40 is a substantially rigid member preferably made of steel or a similar engineering material. The plate 40 includes an annular filter element locating collar 42 and a plurality of vertically extending gusset members 43 which support an elongated mounting bolt 44. The bolt 44 extends centrally through the interior of the element 27 and includes a threaded portion on its distal end for securing the element to the support plate by a nut 45 engaged with the bottom plate 33. A resilient seal ring 46 is preferably interposed between the element 27 and the underside of the plate 40, as shown in FIG. 1. The support plate 40 also includes a vertically upstanding flange part 48 which is adapted to have mounted thereon a mechanical vibrator device generally designated by the numeral 50. The vibrator 50 is of a type which may be electrically or pressure fluid operated and a preferred type is a vibrator manufactured by Vibco, Inc. of Wyoming, R.I. as their model BV380. Referring particularly to FIG. 3, it may be seen that the support plate 40 includes a plurality of circular sector shaped openings 52 formed between the gusset members 43 to provide a flow passage for air to flow from the interior chamber 34 to the annular passage 36.

In accordance with a particuarly advantageous feature of the present invention, the filter element 27 and its support plate 40 are adapted to be secured to a cylindrical flexible wall member 54 which also forms an end wall of the housing 10 and delimits the chamber 24. The resilient support member 54 is preferably made of a flexible material such as a reinforced elastomer. The support member 54 is secured to the filter support plate 40 by a rigid metal support ring 56 and a series of threaded bolts or studs 58 secured to the plate 40 and arranged in a suitable circular pattern on the plate. The support member 54 is also secured to an annular mounting flange 60 by a substantially rigid annular backing plate 62 and a series of bolts 64 arranged in a circular pattern, as shown in FIG. 3. The backing plate 62 preferably extends radially inwardly to a point adjacent the outer circumference of the support ring 56 to thereby serve as a backing or support member over a major portion of the annular area of the support member 54 defined between the inner circumferential edge 61 of the flange 60 and the outer circumferential edge of the support ring 56. The bolts 64, which secure the backing member 62 to the flange 60 also function to secure a cylindrical gasket member 70 to the underside of the flange 60 to form a seal between the flange 60 and the mounting flange 14 of the housing 12. A rigid annular support collar 72 is interposed between the heads of the bolts 64 and the gasket 70.

The assembly of the filter unit 26, including the mounting flange 60, is further provided with a cylindrical air flow directing collar 74 suitably fixed to the backing member 62. A circular pattern of threaded members 76 project vertically, viewing FIG. 1, from the backing member 62 and are adapted to support a cylindrical air flow deflector and shield member 78 spaced from the collar 74 to form the flow passage 36. The shield 78 is characterized as an inverted shallow pan shaped member which provides a bonnet or rain cap to cover the air flow passages 52 and the vibrator 50.

As shown in FIG. 3, the vibrator 50 is arranged to be supplied with pressure fluid through flexible inlet and exhaust conduits 80 and 82 which are suitably coupled to bulkhead type connector members 81 and 83 extending through the sidewall of the collar 74. The sidewall of the shield 78 is suitably recessed adjacent the connectors 81 and 83 to permit the vibrator 50 to be connected to a source of pressure fluid such as relatively low or high pressure compressed air or hydraulic fluid. The aforementioned preferred type of vibrator provides for orbital or oscillatory vibration in a direction generally perpendicular to the longitudinal axis of the rod 44, although the filter may be vibrated in a direction parallel to the rod axis.

The arrangement of the filter unit 26 and the associated supporting structure is also advantageously adapted to function as a pressure relief valve for limiting the differential pressure between the air pressure in the chambers 20 and 24 and exterior atmosphere. The flange 60 is adapted to be secured to the flange 14 by a plurality of spaced apart elongated bolts 90 which extend from the flange 14 through respective clearance holes 91 in the flange 60 and also through tubular collars 92. The collars 92 also extend through clearance holes in the gasket 70 and engage the upper surface of the flange 14. The bolts 90 are each secured by a conventional nut 94 and a washer 96 which is engaged with a coil spring 98 compressively secured between the washer and the upper surface of the flange 60. The nuts 94 are tightened until the washers 96 engage the collars 92, as shown in FIG. 1.

Under the urging of sufficient pressure force acting across the axially projected cross-sectional area within the inner surface of the housing wall 13, the filter unit and the flange 60 will lift away from the flange 14 to provide for air to flow out of the chamber 24 directly to atmosphere. By selecting the tubular collars 92 to be of a predetermined length for a given force-deflection characteristic of the springs 98, the pressure required to lift the flange 60 may be predetermined.

Accordingly, the filter unit 26 also provides a pressure relief valve which may be set to relieve the pressure within the chamber in which the filter element is disposed in the event that the pressure differential between the chamber 24 and the atmosphere approaches a limit which might collapse the element 27 or rupture the filter media 28. Moreover, the pressure relief valve function provided by the structure shown and described may also function to minimize the chance of an overpressure condition within the housing 18, the conduit 22 and associated structure through which the pressure air entering the chamber 20 is flowing.

In the operation of the filter apparatus 10, air laden with particulate matter is conducted through the conduit 22 into the chamber 20 and flows into the chamber 24 through the filter element 27 and out through the chamber 34 and the passage 36 to atmosphere. In certain applications of the filter apparatus 10, heavy loadings of particulate material will eventually tend to clog the filter media 28. By operating the vibrator 50 periodically, or continually as operating conditions may dictate, the entire filter element 27 is vibrated with respect to the housing 12 and the mounting flange 60 to dislodge material accumulated on the outer surface of the media 28 whereupon such material will fall down through the chambers 24 and 20 to a collection hopper or bin described previously. Thanks to the arrangement of mounting of the filter element 27 on the resilient wall member 54, the mechanical vibrations sustained by the filter element are not transmitted to the flange 60 and housing 12, but the entire filter element, including the supporting structure for the media formed by the members 30, 31, 32 and 33, is allowed to mechanically oscillate relatively freely to dislodge material accumulated on the filter media. By providing support structure which allows mechanical oscillation of the entire filter element 27, a minimal level of stress is imposed on the filter element itself and, particularly on the filter media 28. Moreover, the resilient support member 54 also forms an end wall of the chamber 24 and, thanks to the backing member 62, is capable of withstanding a relatively high pressure differential between the chamber 24 and the ambient atmosphere. The support member 54 is shown against the surface of the backing member 62 in the drawing figures; however, under normal operating conditions, the weight of the filter element 27 and the support plate 40 will bias the member 54 downward away from the backing member somewhat.

Although the arrangement of the present invention is adapted to substantially extend the operating life of a filter element of the type described, if it is necessary to change the element, this may be easily done by removing the bolts 90 and lifting the filter unit 26 and the support flange 60 out of the housing. The filter element 27 may then be easily removed from its supporting structure by removing the nut 45 from the distal end of the rod 44 and replacing the element with a similar member.

Figure 4:
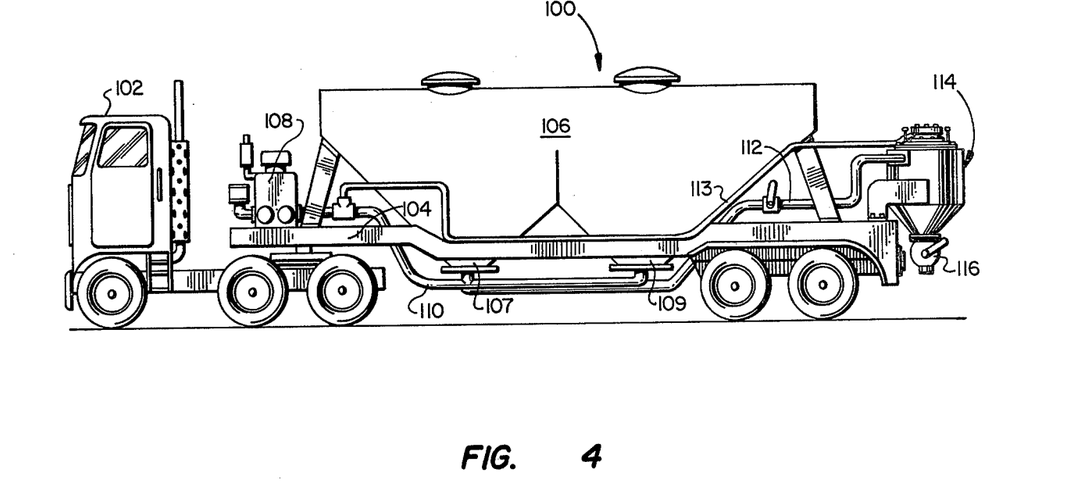
FIG. 4 is a side elevation of a bulk material transport vehicle including a pneumatic conveying system incorporating an alternate embodiment of the present invention.
Figure 5:
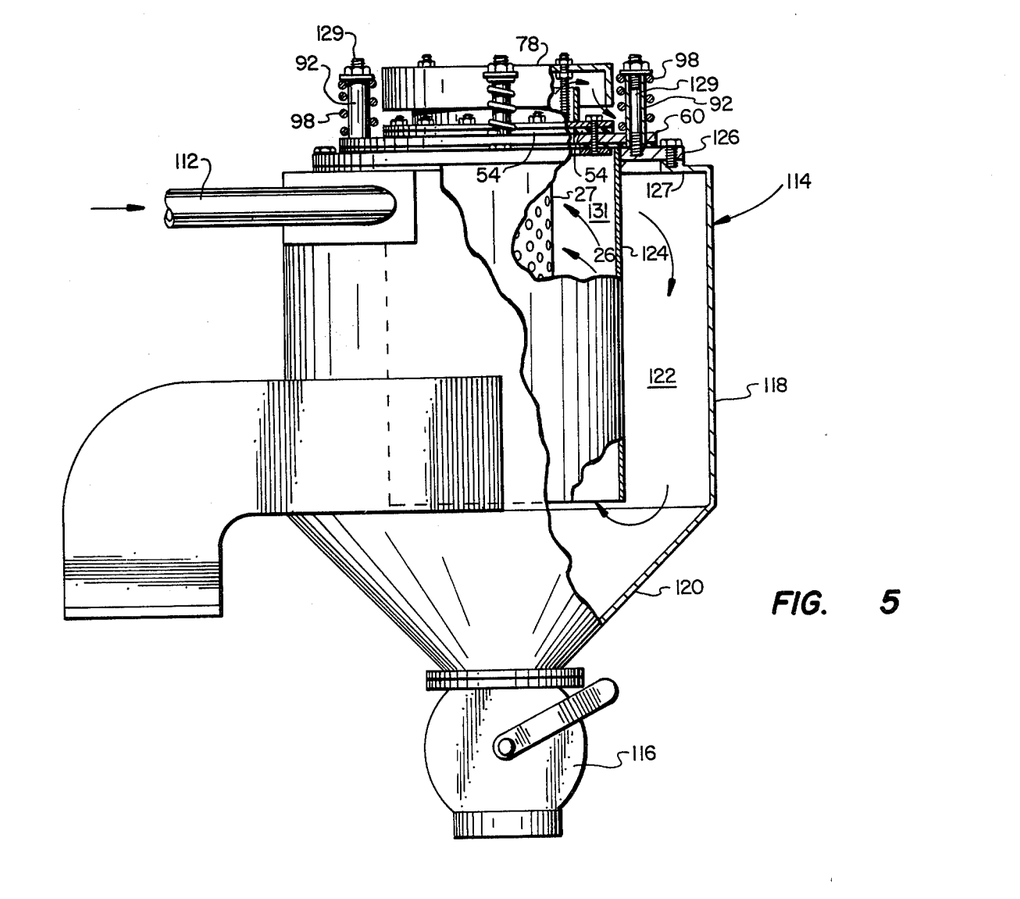
FIG. 5 is a side elevation partially sectioned of a material separating and filtering apparatus for the bulk material conveying system illustrated in FIG. 4.

Referring to FIGS. 4 and 5, an alternate embodiment of the present invention is illustrated in a particuarly preferred application of the self-cleaning filter system. FIG. 4 is a side elevation of a bulk material transport vehicle, generally designated by the numeral 100, which is adapted to include a bulk material discharge apparatus including the self-cleaning air filter system of the present invention. The vehicle 100 is a typical over-the-road semi-trailer and tractor unit including an engine driven tractor 102 and a semi-trailer 104 having a large bulk material transport tank 106 mounted thereon. The tank 106 is adapted to contain bulk material in a particulate or somewhat powdered form such as various types of dry cement materials, flour, sugar or any one of a variety of powdered or flowable materials which may be entrained in a relatively low pressure air stream. The trailer 104 also includes an onboard source of relatively low pressure air comprising an engine driven blower unit 108. The air blower unit 108 includes a discharge conduit 110 which is suitably connected to the tank 106 at longitudinally spaced hopper portions 107 and 109 for injecting relatively large volumes of air at a pressure of approximately 15 psig into the interior of the tank to fluidize the bulk material contained therein. The fluidized material is discharged from the hopper portions 107 and 109 through a conduit 112 which extends rearwardly of the trailer to a receiver and filter unit, generally designated by the numeral 114. The receiver and filter unit 114 is suitably mounted on the trailer and is provided with a bulk material discharge valve 116 depending from the bottom side of the receiver and filter unit. The valve 116 is adapted to be connected to a conduit or disposed over a material receiving hopper at an unloading site, not shown.

The bulk material receiver and filter unit 114 is illustrated in some detail in FIG. 5. The unit 114 includes a generally cylindrical housing 118 having a depending hopper portion 120. The bulk material conveying conduit 112 is connected to the housing 118 generally along a line tangent to the circumference of the housing so that the flowstream of air laden with material entering the interior chamber 122 flows in a somewhat cyclonic or vortical path to effect separation of a substantial portion of the particulate material from the air flowstream. The receiver and filter unit 114 also includes the air filter unit 26 mounted on a housing 124 similar to the housing 12 and which is modified to have only an upper mounting flange 126. The mounting flange 126 is suitably secured to a flange 127 integral with the upper surface of the housing 118 whereby the housing 124 extends substantially entirely within the chamber 122 to provide a compact low profile separator unit.

In the arrangement of the filter unit 26 in FIGS. 4 and 5, the vibrator 50 is adapted to receive pressure air from the blower unit 108 by way of a branch conduit 113 connected to the air supply conduit 110. The mounting flange 126 is rigidly secured to the flange 127 of the housing 118 and the bolts 90, shown in FIG. 1, have been replaced by a plurality of studs 129 which are threaded into the flange 126 so that the mounting flange 60 and the filter unit 26 may be displaced with respect to the flange 126 to allow the filter unit to function as a pressure relief valve for the receiver housing 118 and the bulk material conveying system. The collars 92 extend through the clearance holes in flange 60 and the gasket 70 and rest against the surface of flange 126 as shown in FIG. 5.

Those skilled in the art will appreciate that the filter unit of the present invention is particularly advantageous for use in connection with bulk material conveying systems such as that described herein. The source of pressure air need not be onboard the transport vehicle 100 but may be available at the unloading site from a stationary blower or other source of relatively low pressure air. The particularly heavy dust loadings experienced by the filter element 27 are conveniently handled by periodic timed operation of the vibrator 50 or virtually continuous operation of the vibrator during the unloading cycle so that the filter element may function to filter substantially all particulate material out of the air stream flowing from the chamber 122 to chamber 131 and through the filter element. As described above, the periodic or continuous vibration of the entire filter element 27 assures that accumulated dust or the like is removed from the surface of the filter media without unduly stressing the media and the associated supporting structure. Thanks to the arrangement of mounting of the filter element on the flexible end wall or membrane member 54, the total energy requirements for vibrating the filter are reduced and a vibrator such as the preferred type described herein may easily operate with air at a pressure of approximately 15 psig, thereby being capable of utilizing the same source of air as the bulk material conveying air. Moreover, the flexible wall member 54 is adapted to be supported in such a way that it may flex and absorb the vibrations to prevent transmission thereof to the rest of the filter supporting structure. The wall member 54 is also advantageously provided with the rigid backing member 62 so that the flexible wall member may be exposed to a pressure differential across the filter unit without being severely stressed or distended by pressure forces.

Figure 6:
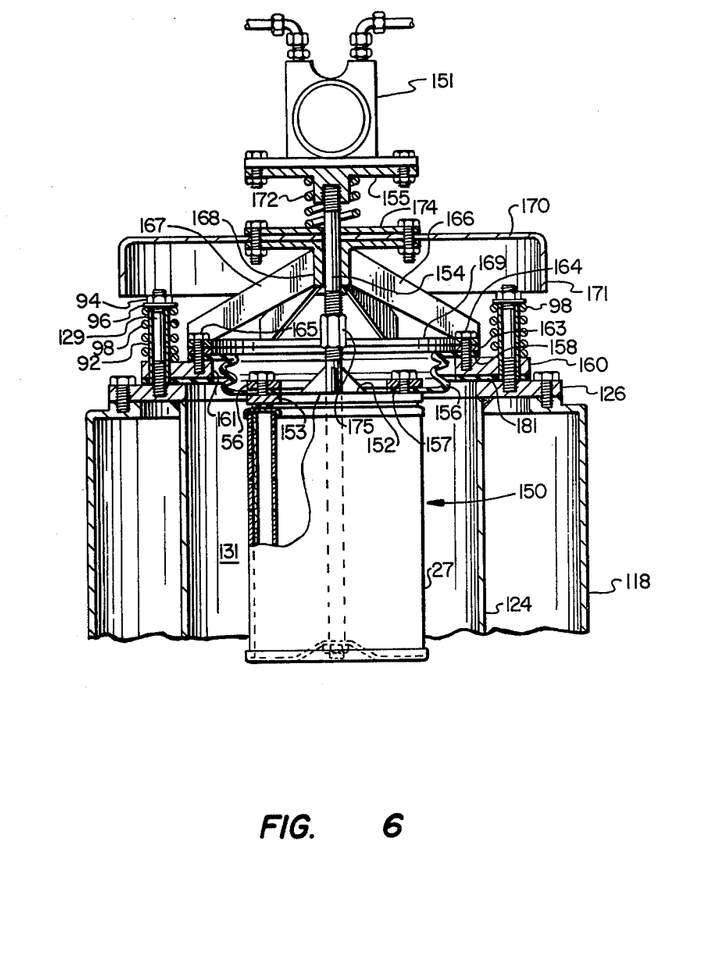
FIG. 6 is a section view of a second alternate embodiment of the self-cleaning filter system.

A second alternate embodiment of a self-cleaning filter unit in accordance with the present invention is illustrated in FIG. 6. Referring to FIG. 6, a self-cleaning vibratory type filter unit, generally designated by the numeral 150, includes the filter element 27 disposed within the housing 125 mounted on the housing 118. The filter unit 150 includes a support plate 152 similar to the support plate 40 but having an elongated support rod 154 extending upwardly from the support plate and connected at its upper end to a mounting bracket 155 on which a vibrator 151 is suitably mounted to cause reciprocal linear vibrations in the direction of the longitudinal axis of the rod 154. The vibrator 151 may be of the pressure fluid actuated reciprocating piston type or a type similar to the vibrator 50, and oriented on the bracket to cause vibrations in the direction described. The opposite end of the rod 154 extends through the filter element 27 and is adapted to secure the element to a cylindrical rim portion 153 of the support plate 152. The support plate 152 is also provided with circular sector shaped openings to provide a flow passage for air to flow from the interior of the filter element upward and out of the filter unit.

In the arrangement illustrated in FIG. 6, the flexible wall member for supporting the filter unit 150 with respect to the circular flange 126 is characterized as a bellows type member, generally designated by the numeral 156, having a plurality of accordian like folds and a lower inwardly turned flange portion 157 adapted to be clamped between the support ring 56 and the rim of the support plate 152. The opposite end of the bellows member 156 includes an outwardly turned flange 158 which is clamped to a support flange 160 having a central bore 161 formed therein. The flange 158 is suitably clamped between the flange 160 and a support ring 163 by a plurality of threaded fasteners 164, as illustrated. In a similar manner, the support ring 56 is secured to the rim 153 by threaded fasteners 165. The flexible bellows type wall member 156 may be formed of an elastomeric material or may also be a formed metal bellows with folds formed therein to permit axial movement of the filter element 27 with respect to the flange 160. However, the filter element 27, the support plate 152 and the vibrator 151, are not required to be supported by the wall member 156.

The filter unit 150 includes a support bracket 166 including somewhat vertically extending spaced apart webs 167 which extend between an upper hub portion 168 and a lower annular rim 169. The rim 169 is adapted to be secured to the flange 160 by the fasteners 164 in assembly with the support ring 163 and the bellows flange 158. The upper surface of the hub 168 is adapted to support a shield or cap 170 having a downwardly turned rim portion 171 to serve as a weather shield and to provide for redirecting the flow of dust free air leaving the filter unit 150. A coil spring 172 is interposed between a backing plate 174 on top of the shield 170 and the support bracket 155 for the vibrator 151.

As illustrated also in FIG. 6, the support rod 154 is threaded along a portion thereof above the plate 152 and is provided with a stop comprising a nut 175, the position of which may be varied on the support rod to limit the amplitude of the vibratory movement of the filter element 27 to prevent distention of the bellows wall member 156. The stop 175 also engages the hub 168 to transfer a pressure lifting force acting on the filter element 27 directly to the bracket 166. The spring 172 is provided with a suitable force-deflection characteristic such that the bellows is normally in a neutral or relaxed position under the urging of the weight of the structure operably connected to the bellows and which would be supported by the bellows save the presence of the spring 172.

The filter unit 150 is also adapted to function as a pressure relief valve and in this regard, the flange 160 is biased against the upper surface of the flange 126 by the coil springs 98 disposed around the respective assemblies of studs 129, retaining nuts 94 and washers 96. Tubular collars 92 are also retained between each of the washers 96 and the upper surface of the flange 126, said collars extending through suitable clearance holes in the flange 160 and a gasket 181.

The arrangement illustrated in FIG. 6 is adapted for applications wherein greater vibratory amplitude is desired in order to maintain the filter element substantially free of accumulations of particulate matter on the filter media. The vibrator 151 or a similar linearly reciprocable vibrator device is adapted to reciprocate the filter element vertically along the axis of the support rod 154. Moreover, the bellows type flexible wall member 156 is also able to withstand higher pressure differentials between the chamber 131 and the ambient atmosphere. If the pressure in the interior of the housing 118 should exceed the predetermined limit as set by the length of the tubular collars 92, the filter unit 150 including the flange 160, will lift off of the flange 126 to provide a flow passage between the faces of the flanges and the interposed gasket member 181. The flange 160 would normally not lift off the flange 126 until the nut 174 engaged the hub 168 to thereby transfer a major portion of the lifting force directly to the flange 160. In applications where relatively high pressure differentials are experienced by the filter unit under normal operating conditions, the flexible wall member may be formed of the aforementioned metal bellows type structure, for example, in order to withstand the higher pressures without unwanted distention.

Several embodiments of the invention have been described and those skilled in the art will recognize that various substitutions and modifications may be made to the specific arrangements shown and described without departing from the scope of the invention as recited in the appended claims.

What I claim is:

1. Apparatus for separating particulate material from an air flowstream comprising:
   a first housing defining a material separation chamber;
   inlet conduit means connected to said first housing and opening into said chamber for conducting a material laden air flowstream to said chamber;
   a second housing including a generally cylindrical elongated open ended tubular member supported on said first housing and in flow communication with said first housing; and
   a self-cleaning filter unit including a cylindrical porous media filter element disposed within said tubular member, support means for said filter element including a resilient membrane positioned to provide a closure for one end of said chamber and including clean air flow passage means for conducting clean air from said chamber, said membrane providing the sole supporting connection between said filter element and said second housing, and means for vibrating said filter element, said means for vibrating being mounted on said support means for said filter element and being mechanically isolated from said second housing by said membrane.

2. The apparatus set forth in claim 1 wherein:
   said filter unit includes a substantially rigid backing member disposed in supportive relationship to said membrane to prevent distention of said membrane by pressure fluid forces acting on said membrane.

3. A self-cleaning air filter apparatus comprising:
   a housing forming an interior chamber, said housing having a first opening at one end of said housing and a second opening for conducting material laden air to said chamber;
   a porous media air filter element disposed in said chamber;
   a support member having clean air passage means and being connected to said filter element so as to support said filter element within said chamber;
   a vibrator connected to said support member for generating mechanical vibrations in said filter element to remove accumulations of particulate material on said filter element;
   a mounting flange secured to said one end of said housing;
   a resilient member connected to said support member and to said mounting flange for supporting said support member and said filter element in said chamber to permit vibration of said filter element with respect to said housing in response to operation of said vibrator, said resilient member comprising a generally cylindrical flat membrane secured around its outer periphery to said mounting flange, said resilient member being positioned and arranged to define a wall closing said one end of said housing; and
   a rigid backing plate secured to said mounting flange adjacent to a side of said resilient member opposite a side exposed to said chamber for supporting said resilient member against deflection due to fluid pressure in said chamber.

4. A self-cleaning air filter apparatus comprising:
   a housing forming an interior chamber, said housing having a first opening at one end of said housing and a second opening for conducting material laden air to said chamber;

a porous media air filter disposed in said chamber and comprising a generally cylindrical pleated paper member and frame means supporting said paper member to form a substantially rigid filter element;

a support member comprising a plate having clean air flow passage means for conducting filtered air from said filter element, an elongated rod extending from said plate and having a threaded portion securing said filter element to said plate and supporting said filter element within said chamber;

a vibrator connected to said support member for generating mechanical vibrations in said filter element to remove accumulations of particulate material on said filter element, said support member being secured to said filter element for mechanical vibration therewith in response to operation of said vibrator;

a rigid support collar and a resilient member releasably clamped to said plate by said collar, said resilient member being connected to said housing at said one end and being positioned and arranged to define a wall closing said one end of said housing and supporting said support member and said filter element in said chamber to permit vibration of said filter element with respect to said housing in response to operation of said vibrator;

a mounting flange supported on said housing at said one end; and a rigid backing plate secured to said mounting flange adjacent to a side of said resilient member opposite a side of said resilient member exposed to said chamber for supporting said resilient member against deflection due to fluid pressure in said chamber.

5. The apparatus set forth in claim 3 or 4 and further comprising:

an inverted pan shaped member mounted on and spaced from said backing plate and covering said clean air flow passage means so as to conduct filtered air from said passage means to the atmosphere.

6. A self-cleaning air filter apparatus comprising:

a housing forming an interior chamber, said housing having a first opening at one end of said housing and a second opening for conducting material laden air to said chamber;

a porous media air filter element disposed in said chamber;

a support member having clean air flow passage means for conducting filtered air from said filter element, said support member including an elongated central rod member supporting said filter element within said chamber;

a vibrator connected to said support member for generating mechanical vibrations in said filter element to remove accumulations of particulate material on said filter element, said vibrator being secured to a portion of said support member for vibrating said support member and said filter element reciprocably along the central axis of said rod member, a bracket mounted on said housing and including a guide for said rod member, and spring means disposed in supportive relationship between said support member and said bracket to permit linear vibration along the central axis of said rod member in response to operation of said vibrator; and a resilient member interconnecting said support member and said housing and being positioned and arranged to define a wall closing said one end of said housing and to permit vibration of said filter element with respect to said housing in response to operation of said vibrator.

7. The apparatus set forth in claim 6 and comprising:

a stop adjustably mounted on said rod member and engageable with said bracket to limit deflection of said resilient member.

8. The apparatus set forth in claim 6 including:

a first flange securing said resilient member to said support member and a second flange securing said resilient member to means supported on said housing; and said resilient member comprises a bellows having a plurality of accordian like folds interposed between said first flange and said second flange.

9. A self-cleaning air filter apparatus comprising:

a housing forming an interior chamber, said housing having a first opening at one end of said housing and a second opening for conducting material laden air to said chamber;

a porous media air filter element disposed in said chamber;

a support member having clean air flow passage means for conducting filtered air from said filter element and connected to said filter element and supporting said filter element within said chamber;

a vibrator connected to said support member for generating mechanical vibrations in said filter element to remove accumulations of particulate material on said filter element;

a mounting flange on said apparatus and secured to said one end of said housing;

a resilient member comprising a generally cylindrical flat membrane secured around its outer periphery to said mounting flange and being positioned and arranged to define a wall closing said one end of said housing, said resilient member being connected to said support member and supporting said support member and said filter element in said chamber to permit vibration of said filter element with respect to said housing in response to operation of said vibrator; and means for yieldably securing said mounting flange to said one end of said housing whereby said filter element and said mounting flange are operable to respond to a fluid pressure force caused by a predetermined pressure differential acting across said resilient member to move with respect to said housing to provide a passage for relief of fluid pressure in said chamber.

10. The apparatus set forth in claim 9 wherein:

said means for yieldably securing said mounting flange includes means for adjusting the fluid pressure force required to move said mounting flange with respect to said housing.

11. The apparatus set forth in claim 10 wherein:

said means for yieldably securing said mounting flange includes a plurality of spaced apart pins secured to said housing and projecting through corresponding holes in said mounting flange, each of said pins being surrounded by a compression spring retained between said mounting flange and a nut threaded over the distal end of each of said pins.

12. The apparatus set forth in claim 11 comprising:

interchangeable collar means disposed over each of said pins and being of a predetermined length to limit the position of said nuts to control the deflection of said springs to thereby determine the pressure force required to move said mounting flange with respect to said housing.

13. A self-cleaning air filter and separator apparatus for a bulk material conveying system, said conveying system including a bulk material storage tank for holding a quantity of particulate material, a source of low pressure air, first conduit means for conducting pressure air from said source to said tank, and second conduit means for conducting a fluidized mixture of particulate material entrained in an air flowstream from said tank to said apparatus, said apparatus comprising a housing having a first opening at one end of said housing and a second opening for conducting material laden air to a chamber formed in said housing and in communication with said second conduit means, said chamber being operable for separating at least a portion of said material from said flowstream, a porous media filter element disposed in said chamber, a vibrator connected to said filter element for vibrating said filter element to remove material accumulated on said filter element, a mounting flange yieldably secured to said housing at said one end of said housing, and a flexible support member supporting said filter element in said housing comprising a generally cylindrical flat membrane secured to said mounting flange and defining a wall closing said one end of said housing, clean air passage means in said apparatus for conducting filtered air from said filter element, said filter element and said mounting flange being responsive to a predetermined pressure differential acting across said membrane to move with respect to said housing to provide a passage for relief of fluid pressure in said chamber.

14. A self-cleaning air filter apparatus comprising:
a housing forming an interior chamber, said housing having a first opening at one end of said housing and a second opening for conducting material laden air to said chamber;
a porous media air filter element disposed in said chamber;
a support member having clean air flow passage means for conducting filtered air from said filter element, said support member being connected to said filter element and supporting said filter element within said chamber;
a vibrator connected to said support member for generating mechanical vibrations in said filter element to remove accumulations of particulate material on said filter element;
a resilient member connected to said support member and to said housing and supporting said support member and said filter element in said chamber to permit vibration of said filter element with respect to said housing in response to operation of said vibrator, said resilient member comprising a flexible membrane supported around its periphery on said housing at said one end of said housing and being positiond and arranged to define a wall closing said one end of said housing; and
means disposed on said apparatus adjacent to a side of said resilient member opposite a side exposed to said chamber for supporting said resilient member against deflection due to fluid pressure in said chamber.

15. A self-cleaning air filter apparatus comprising:
a housing defining an interior chamber, said housing having a flange portion at one end of said housing defining a first opening into said interior chamber, and a second opening in said housing for conducting material laden air to said interior chamber;
a generally cylindrical annular porous media air filter element disposed in said interior chamber, said filter element being positioned in said interior chamber such as to define a clean air flow chamber;
a support member supporting said filter element in said interior chamber and including a portion having clean air flow passage means for conducting clean air out of said clean air flow chamber;
vibrator means mounted on said support member for vibrating said filter element to remove accumulations of particulate material from said filter element; and
a resilient flexible membrane connected to said support member and said housing and supporting said support member and said filter element in said interior chamber, said membrane being positioned to define a closure of said one end of said housing and permitting vibration of said filter element in said interior chamber in response to operation of said vibrator means.

16. The apparatus set forth in claim 15 wherein:
said vibrator means is mounted on said support member such that said vibrator means may be removed from said support member without entering said interior chamber.

17. The apparatus set forth in claim 15 wherein:
said housing includes a horizontal top wall including said flange portion;
and said membrane is supported on a flange member releasably supported on said housing by fastener means whereby said flange member, said membrane, said support member and said filter element may be removed in assembly from said housing.

18. An air filter apparatus comprising:
a housing forming an interior chamber, said housing having a first opening at one end of said housing and a second opening for conducting material laden air to said chamber;
a porous media air filter element disposed in said chamber;
support means connected to said filter element for supporting said filter element within said chamber, said support means including a wall portion at said one end of said housing comprising a closure for one end of said chamber and having clean air passage means for conducting filtered air from said filter element, said support means being mounted on said housing at said one end of said housing and movable relative to said housing to provide a passage for venting pressure fluid from said chamber through said one end of said housing;
and
biasing means for yieldably biasing said support means toward engagement with said housing to prevent pressure fluid from being vented from said chamber through said one end of said housing, said biasing means being responsive to a predetermined pressure differential acting across said wall portion to permit said support means and said filter element to move with respect to said housing to provide said passage for relief of fluid pressure in said chamber.

19. The apparatus set forth in claim 18 wherein:

said biasing means includes means for adjusting the fluid pressure force required to move said support means with respect to said housing.

20. The apparatus set forth in claim 19 wherein: said biasing means includes a plurality of spaced apart pins secured to said housing and projecting through corresponding holes in said support means, each of said pins being surrounded by a compression spring retained between said support means and means forming a shoulder on each of said pins.

* * * * *